United States Patent [19]

Kurihara et al.

[11] Patent Number: 5,024,305
[45] Date of Patent: Jun. 18, 1991

[54] METHOD FOR CONTROLLING VEHICLE TRANSMISSION SYSTEMS

[75] Inventors: Kazumasa Kurihara; Tsutomu Takahashi, both of Higashimatsuyama, Japan

[73] Assignee: Zexel Corporation, Japan

[21] Appl. No.: 552,499

[22] Filed: Jul. 16, 1990

[30] Foreign Application Priority Data

Jul. 28, 1989 [JP] Japan .................................. 1-195722

[51] Int. Cl.$^5$ ............................................ B60K 41/28
[52] U.S. Cl. ............................. 192/0.055; 192/0.076; 192/0.094; 74/866
[58] Field of Search ............ 74/866; 192/0.055, 0.044, 192/0.076, 0.094

[56] References Cited

U.S. PATENT DOCUMENTS

| | | | |
|---|---|---|---|
| 4,478,322 | 10/1984 | Carlson et al. | 192/0.055 |
| 4,495,576 | 1/1985 | Ito | 74/866 X |
| 4,677,880 | 7/1987 | Hattori et al. | 74/866 |
| 4,732,248 | 3/1988 | Yoshimura et al. | 192/0.055 |
| 4,766,988 | 8/1988 | Seibert | 192/0.094 X |
| 4,778,038 | 10/1988 | Ohkawa et al. | 192/0.044 |
| 4,785,917 | 11/1988 | Tateno et al. | 192/0.076 X |
| 4,848,529 | 7/1989 | Kurihara et al. | 192/0.076 |
| 4,893,701 | 1/1990 | Isono et al. | 74/866 X |
| 4,977,992 | 12/1990 | Ohtsuka et al. | 74/866 X |

FOREIGN PATENT DOCUMENTS

| | | | |
|---|---|---|---|
| 3447676 | 8/1985 | Fed. Rep. of Germany | 192/0.044 |
| 63-115955 | 5/1988 | Japan . | |
| 2056595 | 8/1979 | United Kingdom | 192/0.094 |

Primary Examiner—Allan D. Herrmann
Assistant Examiner—Ryan W. Massey
Attorney, Agent, or Firm—Pollock, Vande Sande & Priddy

[57] ABSTRACT

In a method for automatically controlling a vehicle transmission system having a gear-type transmission and a clutch, in the case where the system is controlled in a control mode wherein the clutch is disengaged so as to prevent idle running of the vehicle when the amount of operation of the acceleration pedal becomes less than a prescribed level, when the clutch is engaged in response to an increase in the running speed of the vehicle, the control mode is changed to another control mode in which the engaged state of the clutch is maintained even if the amount of operation of the accelerator pedal becomes zero. Thus, in case of, for example, a vehicle drive-off mode for snow-covered road condition, it becomes possible to realize smooth vehicle running at low speed without need to depress the accelerator pedal.

7 Claims, 3 Drawing Sheets

METHOD FOR CONTROLLING VEHICLE TRANSMISSION SYSTEMS

BACKGROUND OF THE INVENTION

1. Field of the Invention

The present invention relates to a method for controlling vehicle transmission systems, and more particularly to a control method for a vehicle transmission system which includes a friction type clutch and a gear type transmission and is electronically controlled in accordance with the operation condition of the associated vehicle to perform automatic gear-shift operations.

2. Description of the Prior Art

Japanese Patent Application Public Disclosure No. Sho 63-115955 (115955/88) discloses a vehicle automatic transmission system of the type described above, which has a control mode in which low speed vehicle running can be established within a low gear range with the clutch engaged without need to depress the accelerator pedal, which will be referred to as idle running, and another control mode in which the clutch is disengaged when the amount of operation of the accelerator pedal becomes less than a prescribed level, as in a vehicle drive-off mode for snow-covered road condition. However, the vehicle transmission system of the type described above can be operated in still another control mode in which the clutch is engaged for obtaining the braking power of the engine when the vehicle speed increases from a low vehicle speed which is assumed to be tantamount to a vehicle halt condition. This causes certain disadvantages. For example, in the case where the automatic transmission system is operating in a mode in which idle running is impossible, such as the vehicle drive-off mode for snow-covered road condition, when the vehicle is traveling downhill, the clutch may once be engaged to obtain the braking power of the engine but will be automatically disengaged again when the vehicle running speed decreases under the braking power of the engine. Furthermore, after this, as the vehicle accelerates to a high speed by the downhill coasting, the clutch is automatically engaged again to provide the braking power of the engine. Thus, the engaging/disengaging operation of the clutch will be alternatively carried out irrespective of the driver's intention and the accelerating operation and the braking operation are apt to be effected alternatively. This degrades the feel of the vehicle operation.

SUMMARY OF THE INVENTION

It is an object of the present invention to provide an improved method for controlling vehicle transmission systems.

It is another object of the present invention to provide a method for controlling vehicle transmission systems, which is capable of effectively suppressing the performance of unnecessary operation for engaging-/disengaging a clutch.

According to the present invention, in a method for electronically and automatically controlling the gear-shifting operation of a vehicle gear-type transmission coupled through a clutch with an internal combustion engine in response to at least the amount of the operation of an accelerator pedal and the vehicle speed, in the case where the operation is carried out in a control mode wherein the clutch is disengaged so as to prevent the idle running of the vehicle when the amount of operation of the acceleration pedal becomes less than a prescribed level, when the clutch is engaged in response to an increase in the running speed of the vehicle, the control mode is changed to another control mode in which the engaged state of the clutch is maintained regardless of the amount of operation of the accelerator pedal.

Therefore, in the case where a vehicle automatic transmission system according to the present invention operates in, for example, a vehicle drive-off mode for snow-covered road condition, wherein the clutch is disengaged when the amount of operation of the accelerator pedal becomes less than a prescribed level, the clutch is disengaged when the driver removes his foot from the accelerator pedal. After this, the clutch is engaged if the vehicle running speed increases due to downhill coasting, so that the braking power of the engine is applied to the vehicle.

After the clutch has been engaged due to the increase in the vehicle running speed, the control mode of the system is changed to the control mode wherein idle running can be established. Consequently, the clutch is not disengaged again even if the vehicle running speed is lowered due to the application of the braking power of the engine, making it possible to realize a smooth vehicle running at low speed without depression of the accelerator pedal.

The invention will be better understood and other objects and advantages thereof will be more apparent from the following detailed description of preferred embodiments with reference to the accompanying drawings.

DESCRIPTION OF THE PREFERRED EMBODIMENT

Figure 1:
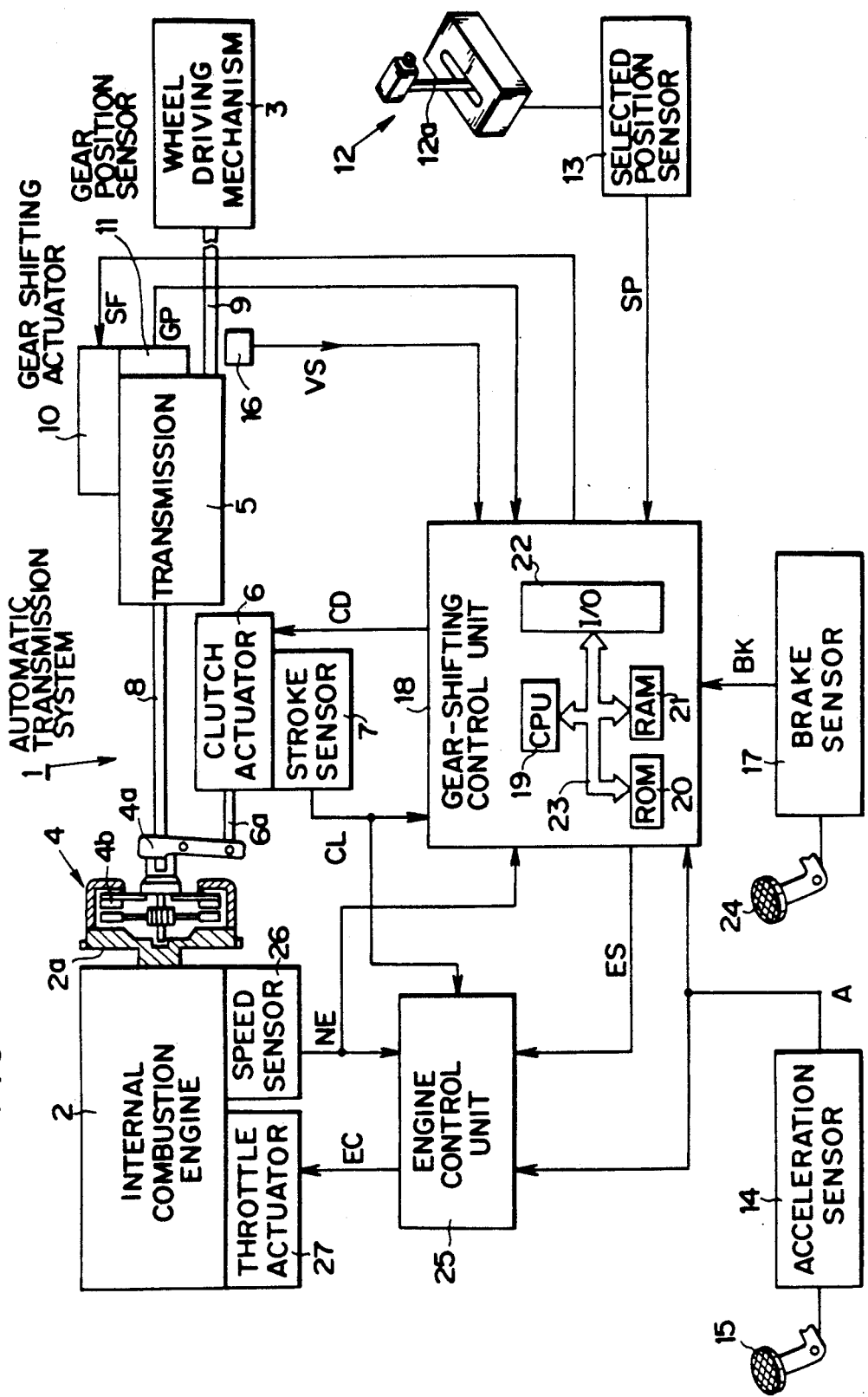
FIG. 1 is a view schematically showing an embodiment of an automatic transmission system for vehicles, whose operation is controlled according to the present invention.

In FIG. 1, an embodiment of an automatic transmission system for vehicles according to the present invention is illustrated in schematic form. Reference numeral 1 generally designates an automatic transmission system for a vehicle (not shown) powered by an internal combustion engine 2 and the automatic transmission system 1 comprises a friction clutch 4 mounted on an engine flywheel 2a and a gear type synchromesh transmission 5. In this embodiment, the friction clutch 4 is a well-known dry-type single-disc clutch having a clutch release lever 4a and a pressure plate 4b. In order to control the engaging/disengaging (ON/OFF) operation of the clutch 4, there is provided a clutch actuator 6 having a piston rod 6a connected to the clutch release lever 4a for actuating the clutch release lever 4a. The clutch actuator 6 is coupled with a stroke sensor 7 for detecting the position of the pressure plate 4b of the clutch 4 and a clutch signal CL indicating the position of the pressure plate 4b is produced by the stroke sensor 7. The clutch 4 is connected by a drive shaft 8 with the transmission 5, and the rotational output of the transmission 5 is transmitted through a propeller shaft 9 to a wheel driving mechanism 3 of the vehicle.

The transmission 5 is actuated by a gear shifting actuator 10 associated therewith, and the gear position set in the transmission 5 is detected by a gear position sensor 11 associated with the transmission 5 to produce a gear position signal GP showing the actual gear position set in the gear transmission 5.

The vehicle has a selector 12 with a selecting lever 12a that is manipulated by the driver to select one position from among a plurality of positions which include an "N" position (neutral), a "2" position, a "3" position, a "4" position, a "D" position (automatic gear changing position), and an "R" position (reverse). That is, the driver manipulates the selecting lever 12a in order to select a desired control mode for the transmission system 1. The selecting lever 12a is coupled with a selected position sensor 13 for producing a selected position signal SP showing the position of the selecting lever 12a. In this embodiment, when the "D" position is selected, the engagement/disengagement of the clutch 4 is controlled so as to establish the idle running in such manner that the clutch 4 is not disengaged in a low speed gear range even if the driver removes his foot from an accelerator pedal 15, but is disengaged only when the rotational speed of the internal combustion engine 2 becomes lower than an engine speed Nc, which is lower than an idling engine speed Ni. On the other hand, the "2" position is for driving the vehicle off in snow covered road condition and the second gear position of the transmission 5 is the lower limit position therefor. Furthermore, in principle, the control operation for disengaging the clutch 4 is carried out in the "2" position when the amount of operation of the accelerator pedal 15 becomes zero, that is, when the driver removes his foot from the accelerator pedal 15.

An acceleration sensor 14 is associated with the accelerator pedal 15 and produces an acceleration signal A showing the amount of operation of the accelerator pedal 15. Reference numeral 16 indicates a known vehicle speed sensor mounted on the propeller shaft 9 for producing a vehicle speed signal VS showing the running speed of the vehicle powered by the engine 2. A brake pedal 24 is coupled with a brake sensor 17 for producing a brake signal BK indicating whether or not braking power is being applied to the vehicle by the brake pedal 24.

The gear-shifting control unit 18 includes a central processing unit (CPU) 19, read-only memory (ROM) 20, random access memory (RAM) 21 and I/O interface 22, which are interconnected by a bus 23 to form a microcomputer. The gear-shifting control unit 18 receives the acceleration signal A, the brake signal BK, the selected position signal SP, the vehicle speed signal VS, the clutch signal CL, the gear position signal GP and an engine speed signal NE output by a known speed sensor 26 associated with the internal combustion engine 2 and indicating the rotational speed of the internal combustion engine 2. These signals are converted into digital form in the I/O interface 22 to obtain acceleration data DA, brake data DB, selected position data DS, vehicle speed data DV, clutch data DL, gear position data DG, and engine speed data DN. These data DA, DB, DS, DV, DL, DG and DN are processed in accordance with a control program (which will be described later) stored in advance in the ROM 20 to produce a shift control signal SF, a clutch control signal CD and an engine control signal ES, which serve to shift the gear of the transmission 5 into a target gear position calculated in the gear-shifting control unit 18 as described later.

The shift control signal SF is applied to the gear shifting actuator 10 for controlling the gear shifting actuator 10 so as to shift the transmission 5 into the determined target gear position, while the clutch control signal CD for engaging or disengaging the clutch 4 is applied to the clutch actuator 6.

The engine control signal ES changes from low to high level at the time of the start of the control operation for gear-changing in the gear-shifting control unit 18 from high to low level at the time of the termination of the control operation for gear-changing in the gear-shifting control unit 18. The engine control signal ES is supplied to an engine control unit 25 which also receives the acceleration signal A, the clutch signal CL and the engine speed signal NE.

The engine control unit 25 functions to regulate the engine speed based on the manipulation of the accelerator pedal 15 when the level of the engine control signal ES is low. Namely, the engine control unit 25 is responsive to the acceleration signal A to produce an engine speed control signal EC, which is applied to a throttle actuator 27 for controlling the fuel supply to the engine 2. Thus, the throttle actuator 27 is actuated by the engine speed control signal EC in accordance with the amount of operation of the accelerator pedal 15 and the engine speed can be regulated in accordance with the manipulation of the accelerator pedal 15. The above-described operation is performed by the engine control unit 25 only when the level of the engine control signal ES is low.

When the level of the engine control signal ES is high, the engine control unit 25 functions to maintain the engine speed at its idling speed in response to the engine speed signal NE. Accordingly it is possible to suppress excessive increase in engine speed while the clutch is disengaged for shifting gears.

According to the control program stored in the ROM 20, the shift control signal SF and the clutch control signal CD can be produced as a set of control signals from the gear-shifting control unit 18 for automatically shifting the gear position of the transmission 5 to the suitable position for the operation condition of the vehicle when required, and the transmission 5 and the clutch 4 are controlled in the usual manner by means of the gear shifting actuator 10 and the clutch actuator 6 in response to the signals SF and CD, respectively.

The control program will now be described in more detail, with reference to FIGS. 2 and 3.

Figure 2:
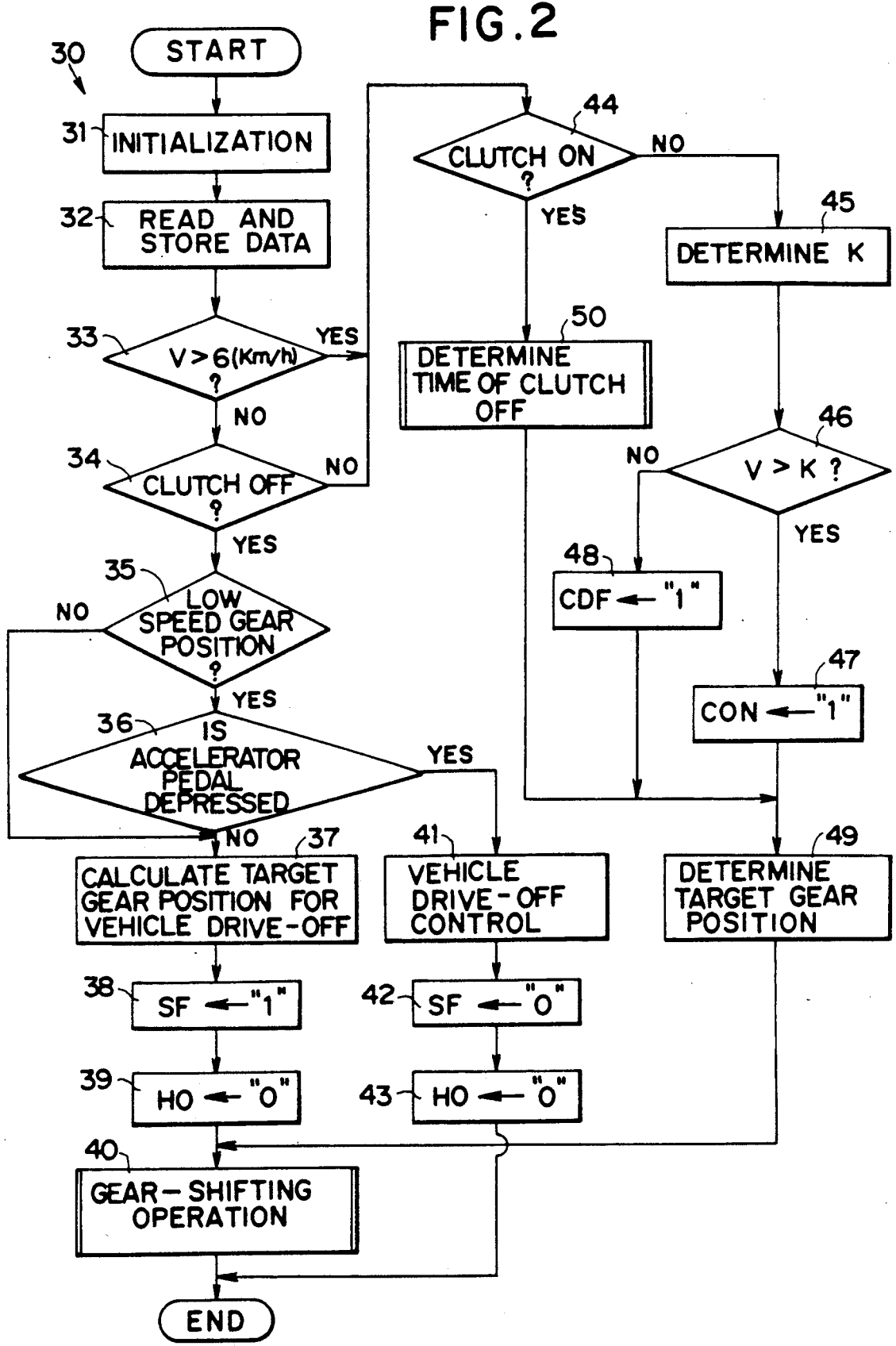
FIG. 2 is a flowchart showing a control program executed in a gear-shifting unit shown in FIG. 1.

In FIG. 2, reference numeral 30 designates a control program which is repeatedly executed in the CPU 19 of the gear-shifting control unit 18 at regular intervals. When the execution of the control program 30 starts, the operation moves to step 31 wherein an initialization operation is executed. After this, the operation moves to step 32 wherein data DA, DB, DS, DV, DL, DG and DN are input and stored in the RAM 21. Then, the operation moves to step 33 wherein discrimination is made as to whether or not the vehicle running speed V indicated by the vehicle speed signal VS is greater than 6 (km/h).

The determination in step 33 is NO when the vehicle running speed is not greater than 6 (km/h), and the operation moves to step 34 wherein discrimination is made on the basis of the clutch signal CL as to whether or not the clutch 4 is in its disengaged (OFF) condition. The determination in step 34 is YES when the clutch 4 is in its disengaged state, and the operation moves to step 35 wherein discrimination is made on the basis of the gear position signal GP as to whether or not the actual gear position in the transmission 5 is within a predetermined low speed gear position range, that is, whether it is in a first gear position, a second gear position or a reverse gear position. When the transmission 5 is in the predetermined low speed gear position range, the operation moves to step 36 wherein discrimination is made on the basis of the acceleration signal A as to whether or not the accelerator pedal 15 is depressed. When at least one of the determinations in steps 35 and 36 is NO, the operation moves to step 37 wherein a target gear position for driving the vehicle off is calculated.

In summary, step 37 is executed only when all of the following conditions (a) to (c) are satisfied.
(a) The vehicle running speed is not greater than 6 (km/h).
(b) The clutch 4 is in its disengaged state.
(c) The transmission 5 is in a gear not within the predetermined low speed gear position range, or the accelerator pedal is not depressed but the transmission 5 is in the predetermined low gear position range.

When the execution of step 37 is completed, the operation moves to step 38 wherein a flag SF indicative of the halt condition of the vehicle is set, and further moves to step 39 wherein a flag HO is cleared, which indicates that the vehicle running speed has increased from the halt condition and reached a prescribed level.

Then, the operation moves to step 40 wherein a desired gear-shifting operation is carried out. In this case, it follows that the transmission 5 is shifted into the target gear position calculated in step 37.

When the determination in step 36 is YES, in other words, when the vehicle is running at a speed lower than 6 (km/h) with the clutch 4 disengaged and the accelerator pedal 15 is depressed, the operation moves to step 41 wherein the control operation necessary for driving the vehicle off is carried out and the flags SF and HO are cleared in steps 42 and 43, respectively.

Description will now be given to the case where the determination in step 33 is YES under the condition that the vehicle is running, or the vehicle running speed is not higher than 6 (km/h) with the clutch 4 engaged.

For the cases indicated above, the operation moves to step 44 wherein discrimination is made as to whether or not the clutch 4 is in its engaged state. The operation moves to step 45 when the clutch 4 is in the disengaged state, and the vehicle running speed K at which the clutch 4 is to be engaged is determined in step 45 for the gear position at that time. After this, the operation moves to step 46 wherein discrimination is made as to whether or not the vehicle running speed at that time is higher than K. The operation moves to step 47 wherein a flag CON indicating that the clutch 4 is to be engaged, is set when the vehicle running speed is higher than K. In contrast, the operation moves to step 48 wherein a flag CDF indicating that the clutch 4 is to be disengaged, is set when the vehicle running speed is not higher than K.

When one of the flags CON and CDF is set, the operation moves to step 49 wherein a target gear position suitable for the operation condition of the vehicle at that time is determined, and the gear shifting operation for shifting the transmission 5 to the target gear position is carried out in step 40. At the same time, the engaging-/disengaging operation of the clutch 4 is also carried out in accordance with the states of the flags CDF and CON.

When the determination in step 44 is YES, the operation moves to step 50 wherein the time at which the clutch 4 should be disengaged is determined.

Figure 3:
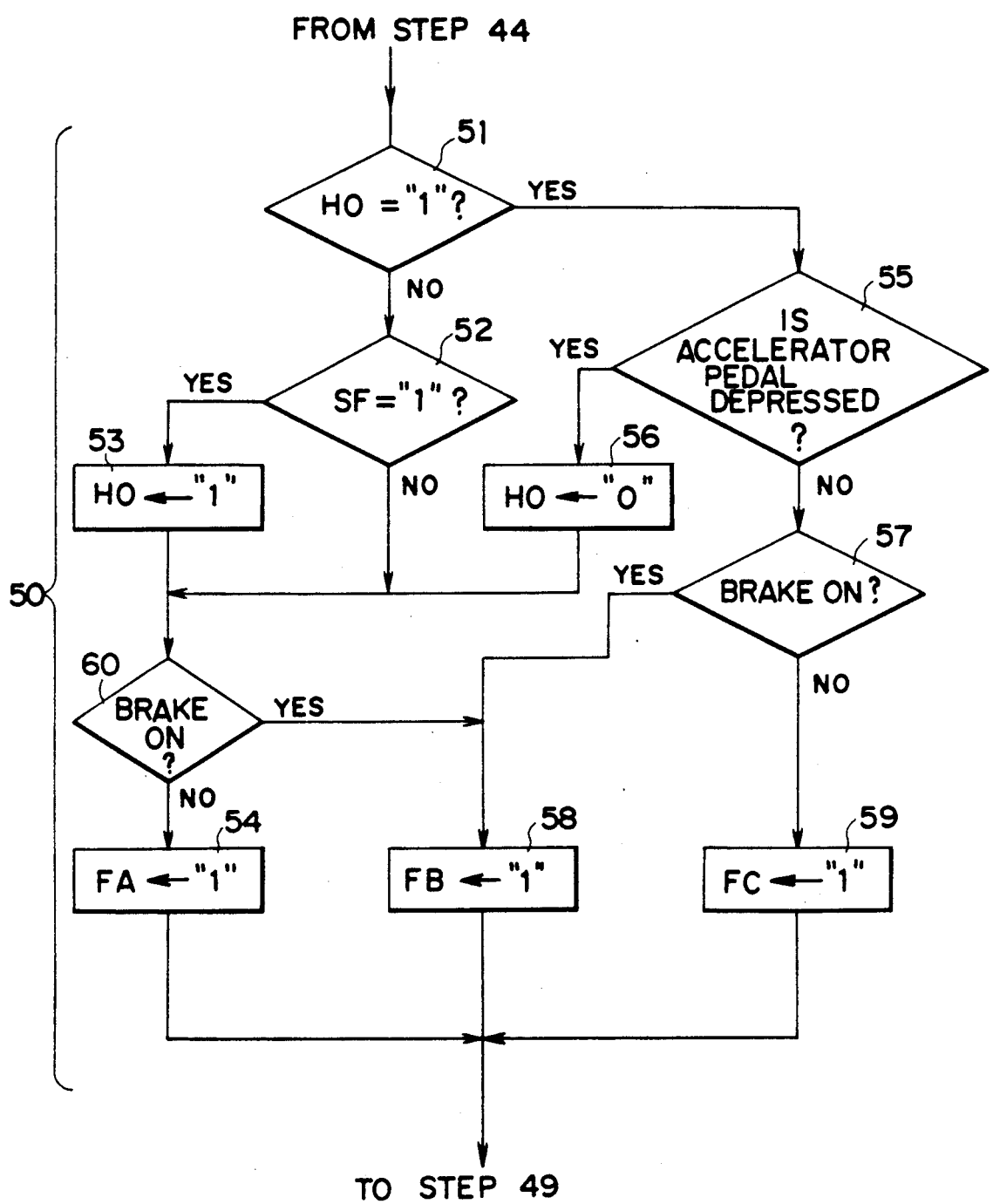
FIG. 3 is a detailed flowchart showing a part of the control program shown in FIG. 2.

FIG. 3 illustrates a detailed flowchart showing the process carried out in step 50. When the determination in step 44 is YES, the operation moves to step 51 wherein discrimination is made as to whether or not the flag HO is in a set condition. The determination in step 51 is NO when the flag HO is in a cleared state, and the operation moves to step 52 wherein discrimination is made as to whether or not the flag SF indicating the halted condition of the vehicle is in a set condition. The flag HO is set in step 53 when the flag SF is in a set condition, and the operation then moves to step 60 wherein discrimination is made as to whether or not the brake pedal 24 is depressed. The operation moves directly to step 60 when the determination in step 52 is NO.

The operation moves to step 54 when the determination in step 60 is NO, and a flag FA is set therein. On the other hand, the operation moves to step 58 when the determination in step 60 is YES. In this case, the flag HO is set in step 53 when the clutch 4 is engaged again because of the increase in vehicle running speed after the vehicle was once halted. The flag FA is for indicating that the rotational speed of the internal combustion engine 2, at which the clutch 4 is to be disengaged, is a prescribed speed Na which is little higher than the idling engine speed Ni. The operation moves to step 49 (FIG. 1) after the flag FA is set in step 54, and the operation moves to step 40 wherein the necessary operations of the clutch 4 and the transmission 5 are carried out. If the flag FA is in a set condition, the operation for disengaging the clutch 4 is carried out when the rotational speed of the internal combustion engine 2 becomes lower than Na. Accordingly, in the case where the flag FA is set, the clutch 4 is disengaged if, for example, the driver removes his foot from the accelerator pedal 15 so that the engine speed becomes equal to the idling engine speed Ni.

The determination in step 51 is YES if the flag HO had already been set before the execution of the discrimination of step 51, and the operation moves to step 55 wherein discrimination is made as to whether or not the accelerator pedal 15 is depressed. The determination in step 55 is YES when the accelerator pedal 15 is being depressed, and the operation moves to step 60 after the flag HO is cleared in step 56. That is, when the accelerator pedal 15 is being depressed in the case where the clutch 4 is engaged due to the increase in the vehicle running speed after the vehicle was once halted, i.e., the flag HO is in a set condition, the flag HO is cleared because the vehicle is in a running condition in accordance with the amount of operation of the accelerator pedal 15. In this case, the flag FA is set when the brake pedal 24 is not depressed. Consequently, it follows that the clutch 4 is disengaged when the amount of operation of the accelerator pedal 15 becomes zero so that the engine speed becomes lower than Na. The flag FB is set if the brake pedal 24 is depressed.

The operation moves to step 57 when the determination in step 55 is NO, and discrimination is made in step 57 as to whether o not the brake pedal 24 is depressed on the basis of the brake signal BK. The determination in step 57 is YES when the brake pedal 24 is depressed, and the operation moves to step 58 wherein flag FB is set.

The flag FB is for indicating that the rotational speed of the internal combustion engine 2, at which the clutch 4 is to be disengaged, is a speed Nb which is little higher than the speed Na. Therefore, in the case where braking power is applied to the vehicle by the depression of the brake pedal 24, the flag FB is set and the clutch 4 is disengaged at the time the engine speed becomes lower than Nb.

The determination in step 57 is NO when the brake pedal 24 is not depressed, and the operation moves to step 59 wherein a flag FC is set. The flag FC is for indicating that the rotational speed of the internal combustion engine 2, at which the clutch 4 is to be disengaged, is a speed Nc which is little lower than the idling engine speed Ni.

Consequently, when the accelerator pedal 15 is not depressed and no braking power caused by the operation of the brake pedal 24 is applied to the vehicle in the case wherein it is determined in step 51 on the basis of the flag HO that the clutch 4 is in its engaged state due to the increase in the vehicle running speed starting from the halt condition of the vehicle, the engagement of the clutch 4 is maintained unless the engine speed is lowered below Nc which is lower than the idling engine speed Ni, so that a so-called "idle running state", in which the engagement of the clutch 4 is maintained even if the rotational speed of the internal combustion engine 2 is lowered to near the idling engine speed by no depression of the accelerator pedal 15, can be realized.

As stated above, with the aforesaid constitution of the system 1, the flag HO is reset when the clutch 4 is engaged again after the clutch 4 was once disengaged because the vehicle assumed a halt condition, which is defined as a vehicle speed lower than 6 (km/h) in this embodiment, and the flag FC is set when the flag HO is in a set state, so that idle running is possible for the vehicle. Accordingly, under the condition where the flag HO is set, the idle running can be performed even if, for example, the vehicle is running in the "2nd position " mode wherein the engagement set of the clutch 4 is discontinued when the driver removes his foot from the accelerator pedal 15.

Consequently, in the case where the vehicle is once halted in the course of running downhill in the "2nd position" and then the vehicle speed is increased by downhill coasting to engage the clutch 4, the flag HO is set, so that the braking power of the internal combustion engine 2 is applied to the vehicle as the engagement of the clutch 4 is maintained. As a result, the idling running state is maintained even if the vehicle speed becomes smaller than 6 (km/h) unless the engine speed becomes lower than Nc, and this enhances the comfort of the car occupants because repeated engaging/disengaging operation the clutch 4 can be avoided. In this case, since it is possible for the clutch 4 to be disengaged when the driver removes his foot from the accelerator pedal 15 at the time of the vehicle drive-off, there is no problem when the vehicle is running on a snow-covered road.

We claim:

1. A method for electronically and automatically controlling a gear-shifting operation of a vehicle transmission system having a gear-type transmission and a clutch coupled with an internal combustion engine in response to at least the amount of the operation of an accelerator pedal and a running speed of a vehicle, said method comprising steps of:

discriminating whether or not the clutch has engaged in response to an increase in the running speed of the vehicle after the clutch is once disengaged in the case where the gear-shifting operation is carried out in a control mode wherein the clutch is disengaged so as to prevent idle running of the vehicle when a rotational speed of the engine becomes lower than a first level which is a little higher than an idling speed of the engine;

discriminating whether or not a brake pedal is depressed; and changing the control mode to another control mode in which the engaged state of the clutch is maintained unless the rotational speed of the engine becomes lower than a second level which is a little lower than the idling speed if the brake pedal is not depressed when the clutch has engaged in response to the increase in the running speed.

2. A method as claimed in claim 1, wherein said discriminating step has a first step of detecting the running speed of the vehicle, a second step of detecting that the clutch is in its disengaged state, and a third step of detecting a condition where the clutch has engaged after the clutch is disengaged under a low running speed of the vehicle.

3. A method as claimed in claim 1, wherein said method further comprises a step of detecting that the accelerator pedal is depressed, and the control mode is not changed to the other control mode when the accelerator pedal is depressed.

4. A method as claimed in claim 1, wherein the clutch is disengaged when the rotational speed of the engine becomes lower than a third level higher than the first level in the case where the brake pedal is being depressed.

5. A method for electronically and automatically controlling the gear-shifting operation of a vehicle transmission system having a gear-type transmission and a clutch coupled with an internal combustion engine in response to at least the amount of the operation of an accelerator pedal and a running speed of a vehicle, the gear-shifting operation being carried out in a control mode wherein the clutch is disengaged so as to prevent the idle running of the vehicle when the amount of operation of the acceleration pedal becomes less than a prescribed level, said method comprising steps of:

discriminating whether or not the clutch has engaged in response to an increase in the running speed of the vehicle after the clutch is once disengaged; and changing the control mode to another control mode in which the engaged state of the clutch is maintained even if the amount of operation of the accelerator pedal is less than the prescribed level when the clutch has engaged in response to the increase in the running speed.

6. A method as claimed in claim 5, wherein said discriminating step has a first step of detecting the running speed of the vehicle, a second step of detecting that the clutch is in its disengaged state, and a third step of detecting a condition where the clutch has engaged after the clutch is disengaged under a low running speed of the vehicle.

7. A method as claimed in claim 5, wherein the clutch is controlled so as to be disengaged when a rotational speed of the engine becomes lower than an idling speed of the engine in the case where the control mode is changed to the other control mode.

* * * * *